Oct. 14, 1958 R. E. WHITED ET AL 2,856,025
GREASE FITTING
Filed May 19, 1955
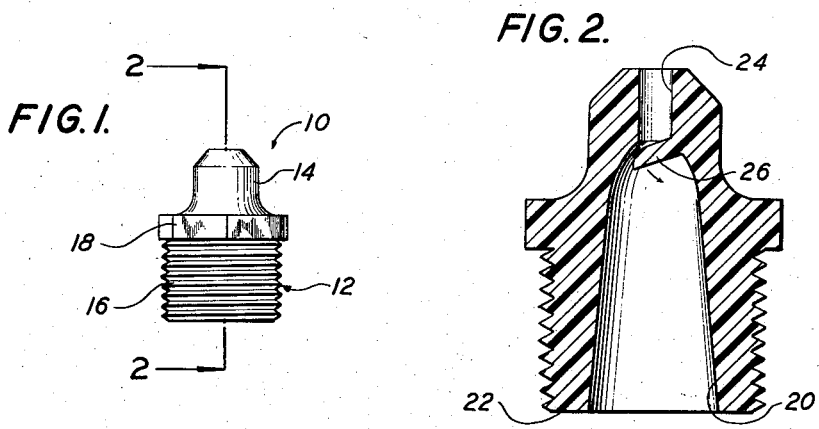
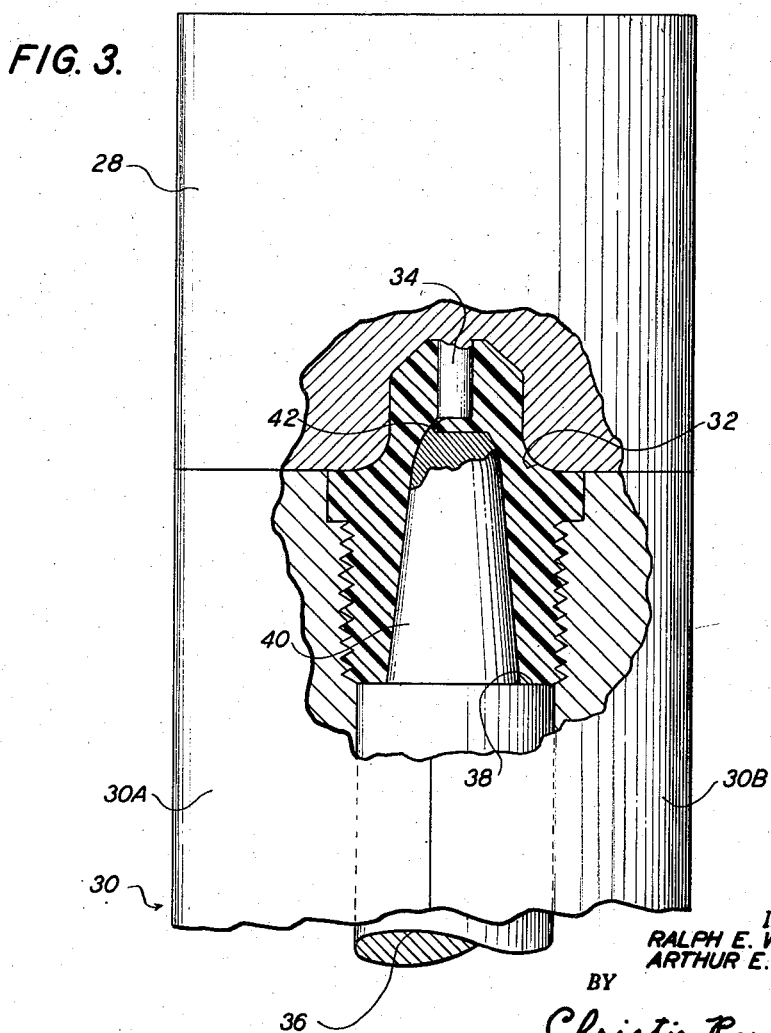
INVENTORS.
RALPH E. WHITED
ARTHUR E. MAYBRUN
BY
Christie, Parker & Hale
ATTORNEYS

United States Patent Office 2,856,025
Patented Oct. 14, 1958

2,856,025

GREASE FITTING

Ralph E. Whited, Altadena, and Arthur E. Maybrun, Pasadena, Calif.

Application May 19, 1955, Serial No. 509,445

1 Claim. (Cl. 184—105)

This invention relates to valve apparatus and has particular reference to check valves such as grease fittings and the like.

Grease fittings are normally made from metal and take the form of a hollow body having external threads at one end and a tit portion at the other end. The tit portion has a small bore which opens into the body, and a one-way valve is formed by a spring-loaded metal ball seating in the end of the tit bore inside the fitting.

At best, manufacturing such a grease fitting involves the separate fabrication of the body, the spring and the ball and requires assembly of these components. As grease fittings are subject to abuse and receive the grease under pressure, this construction has been considered justified.

We have discovered a way to make a simpler fitting of sufficient ruggedness at about one-third the cost of making ordinary fittings.

The check valve of our invention comprises a hollow body having an inside surface defining an interior bore, and a lip formed integrally and flexibly joined to the body, the lip protruding from the inside surface and extending across the bore to act as a valve.

The check valve may be molded in one piece from tough flexible materials such as polyethylene plastics, nylon, synthetic rubbers and the like. These materials are available in a variety of colors which make the check valve more distinguishable among the multitude of parts usually found on automobiles and other mechanical apparatus with which it may be used.

In molding the check valve, a core is used to form its inside surface. The core has an undercut portion at one end for shaping the lip. The flexibility of the lip allows the core to be removed when the material has set.

The invention is described in detail with reference to a preferred embodiment shown in the accompanying drawings, in which:

Fig. 1 is an elevation view of the check valve;

Fig. 2 is a longitudinal cross-section of the check valve; and

Fig. 3 is a drawing showing how the check valve may be molded.

With reference to Figs. 1 and 2, the check valve 10 has a cylindrical body portion 12 and a tit or nipple portion 14 which protrudes from one end of the body. Exteriorly, the valve may be of any conventional configuration for grease fittings or the like.

The body is provided with external threads 16 and has an octagonal portion 18 formed on its exterior at a position intermediate the threads and tit. The interior of the body is hollowed out, there being an inside surface 20 which defines a chamber shaped like a circular cone opening through the threaded end of the body, with the apex of the cone being rounded and terminating inside the base of the tit. This forms an annular surface 22 at the end of the body opposite the tit. A relatively small second bore 24 opens through the end of the tit and extends axially to make a juncture with the rounded apex of the first bore.

A lip 26 is formed integrally and flexibly joined with the check valve. The lip protrudes from one side of the inside surface adjacent the junction of the bores and extends across the rounded apex of the first bore. The lip is shaped to fit the rounded apex of the first bore and seats across the junction of the bores to provide a one-way valve action.

The check valve may be made with the apparatus shown in Fig. 3. A first mold 28 fits on top of a second mold 30 to define a molding surface 32 for shaping the exterior of the fitting. The second mold is composed of two pieces 30A and 30B to facilitate the removal of the finished check valve.

A first core member 34 depends from the inside of the upper mold to form the bore of the tit and a portion of the top surface of the lip.

A second core member 36 is removably inserted into the second mold. This core member has a base surface 38 for forming the annular surface at the threaded end of the check valve, and a conical portion 40 for forming the first bore. The apex of the conical portion 40 is rounded and has an undercut portion 42 which locates against the bottom of the first core member and shapes the lip.

To make the check valve, the molds and cores are assembled as described and a plastic substance is forced under pressure into the molds through a gate or small opening (not shown). The substance is set, and the finished check valve is taken out.

To remove the finished check valve the first and second molds are removed; then the second core is pulled out, which is possible because the lip is flexible. The resulting check valve is of integral one-piece construction.

The check valve may be used as a grease fitting for automobiles and other mechanical apparatus. A conventional grease pump may be used to engage the tit and pump grease through the check valve into the housing of the mechanism to be greased. The threads on the body of the check valve serve as a means for attaching the valve to the housing.

The integral lip performs the entire function of the spring and ball arrangement presently used in conventional grease fittings. It bends away from the junction of the bores to admit grease under pressure and then seats against the junction when the pressure is relaxed. Since the lip fits across the junction and cannot be bent in the opposite direction, it acts as a one-way valve.

We claim:

A grease fitting composed in a single piece of flexible plastic material comprising a body portion, a nipple portion protruding from one end of the body portion and having a small bore which serves as an inlet for the grease, the body portion having an inside surface that defines a chamber which opens through the opposite end of the body portion and extends interiorly of the body portion to connect with the small inlet bore, and a flexible lip portion integrally joined at one side to the interior wall of the body portion and normally extending therefrom across the junction of the chamber and the inlet bore to thereby close the bore, the lip being movable in the direction of grease flow to open the bore and otherwise seating against the junction of the chamber and the inlet bore, so that the chamber is sealed except when grease is being forced through the inlet bore toward the chamber.

References Cited in the file of this patent

UNITED STATES PATENTS

| | | |
|---|---|---|
| 15,192 | Peale | June 24, 1856 |
| 670,794 | Lott | Mar. 26, 1901 |
| 1,315,955 | Gill | Sept. 16, 1919 |
| 1,468,887 | Sterrick | Sept. 25, 1923 |
| 2,594,040 | Le Clair | Apr. 22, 1952 |
| 2,682,057 | Lord | June 29, 1954 |
| 2,797,703 | Edwards | July 2, 1957 |

FOREIGN PATENTS

| | | |
|---|---|---|
| 672,884 | Great Britain | May 28, 1952 |
| 988,988 | France | of 1951 |